United States Patent
Lee

(10) Patent No.: US 11,138,408 B2
(45) Date of Patent: Oct. 5, 2021

(54) METHOD AND APPARATUS FOR VERIFYING FINGERPRINT

(71) Applicant: SAMSUNG ELECTRONICS CO., LTD., Suwon-si (KR)

(72) Inventor: Younkyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 16/521,697

(22) Filed: Jul. 25, 2019

(65) Prior Publication Data

US 2020/0218880 A1  Jul. 9, 2020

(30) Foreign Application Priority Data

Jan. 3, 2019 (KR) .................. 10-2019-0000673

(51) Int. Cl.
*G06K 9/00* (2006.01)

(52) U.S. Cl.
CPC ..... *G06K 9/00087* (2013.01); *G06K 9/00067* (2013.01); *G06K 9/00926* (2013.01)

(58) Field of Classification Search
CPC ........... G06K 9/00067; G06K 9/00073; G06K 9/0008; G06K 9/00087; G06K 9/00093; G06K 9/001; G06K 9/00926; G06K 9/4633

See application file for complete search history.

(56) References Cited

U.S. PATENT DOCUMENTS

| | | | | |
|---|---|---|---|---|
| 6,049,621 A * | 4/2000 | Jain | ...... | G06K 9/00087 382/125 |
| 6,185,318 B1 * | 2/2001 | Jain | ...... | G06K 9/00087 382/115 |
| 7,151,846 B1 * | 12/2006 | Fujii | ...... | G06K 9/00067 382/125 |
| 7,539,331 B2 * | 5/2009 | Wendt | ...... | G06K 9/0008 358/2.99 |
| 7,876,933 B2 * | 1/2011 | Jang | ...... | G06K 9/3208 382/124 |
| 8,041,956 B1 * | 10/2011 | White | ...... | G06K 9/00073 713/186 |

(Continued)

FOREIGN PATENT DOCUMENTS

JP 2720995 B2 3/1998
KR 10-2015-0027011 A 3/2015

OTHER PUBLICATIONS

Jakubowski et al., Randomized Radon Transforms for Biometric Authentication via Fingerprint Hashing, Microsoft Research, Redmond, WA, 7th ACM DRMWorkshop Oct. 29, 2007, pp. 90-94. (Year: 2007).*

(Continued)

*Primary Examiner* — Ian L Lemieux
(74) *Attorney, Agent, or Firm* — Sughrue Mion, PLLC

(57) ABSTRACT

A method of verifying a fingerprint includes selecting a feature point from among feature points of a fingerprint image, the selected feature point matching a registered feature point; determining a partial region of the fingerprint corresponding to the feature point in the fingerprint image; obtaining feature information of the partial region of the fingerprint in the fingerprint image; and verifying the fingerprint based on the feature information of the partial region in the fingerprint image.

14 Claims, 10 Drawing Sheets

(56) References Cited

U.S. PATENT DOCUMENTS

| | | | |
|---|---|---|---|
| 8,625,861 B2 | 1/2014 | Aggarwal et al. | |
| 9,904,835 B1 | 2/2018 | Hsu | |
| 10,198,610 B1* | 2/2019 | Yousefpor | G06F 3/0488 |
| 10,262,185 B2* | 4/2019 | Chen | G06K 9/4642 |
| 2002/0028019 A1* | 3/2002 | Hemiari | G06K 9/4633 |
| | | | 382/190 |
| 2007/0189586 A1* | 8/2007 | Monden | G06K 9/0008 |
| | | | 382/124 |
| 2007/0297653 A1* | 12/2007 | Bolle | G06K 9/00073 |
| | | | 382/124 |
| 2008/0273770 A1 | 11/2008 | Kohout | |
| 2009/0310830 A1* | 12/2009 | Bolle | H04L 9/0866 |
| | | | 382/124 |
| 2009/0310831 A1* | 12/2009 | Zhang | G06K 9/00073 |
| | | | 382/125 |
| 2011/0304720 A1* | 12/2011 | Kumar | G06K 9/00892 |
| | | | 348/77 |
| 2012/0014570 A1* | 1/2012 | Abe | G06K 9/00067 |
| | | | 382/124 |
| 2016/0042516 A1* | 2/2016 | Tieu | G06K 9/4671 |
| | | | 382/124 |
| 2016/0314337 A1* | 10/2016 | Suh | G06K 9/00093 |

OTHER PUBLICATIONS

Roli Bansal et al., "Minutiae Extraction from Fingerprint Images—a Review", Sep. 2011, IJCSI International Journal of Computer Science Issues, vol. 8, Issue 5, No. 3, pp. 74-85 (12 pages total).

* cited by examiner

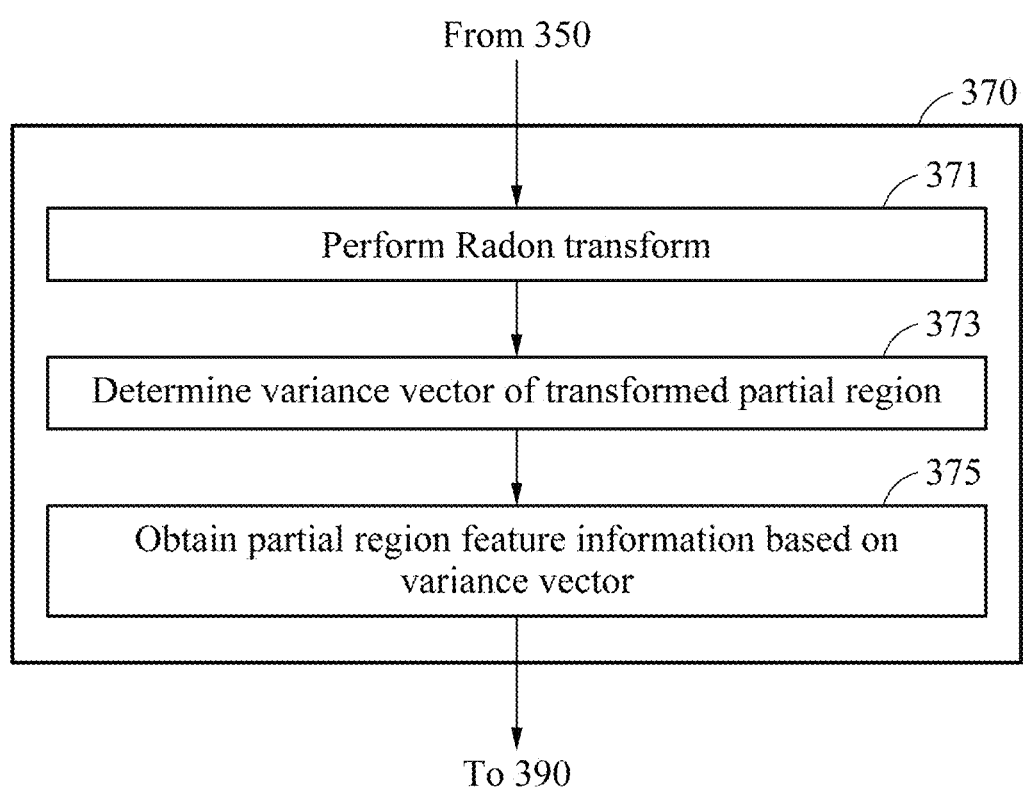

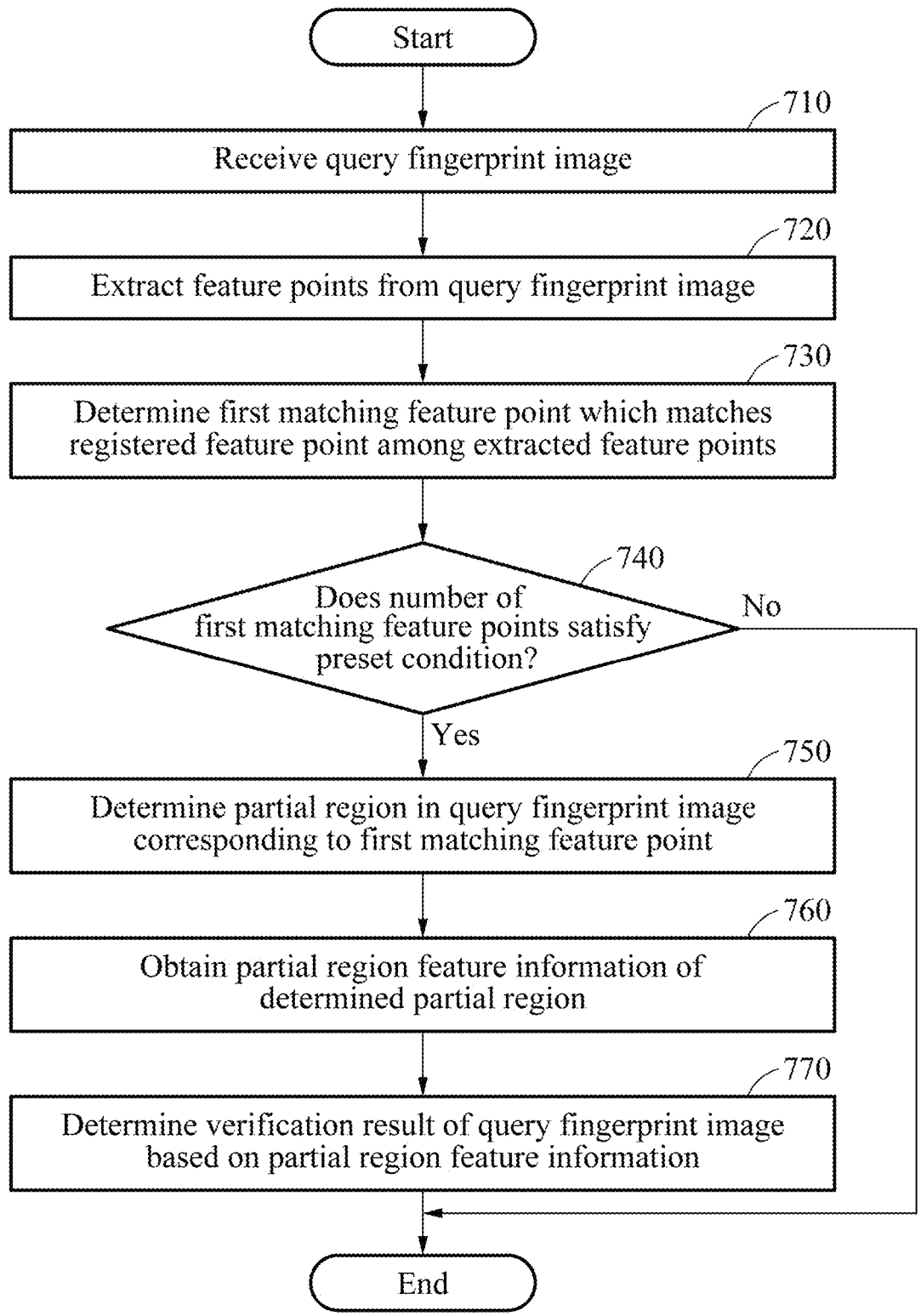

METHOD AND APPARATUS FOR VERIFYING FINGERPRINT

CROSS-REFERENCE TO RELATED APPLICATION

This application claims priority from Korean Patent Application No. 10-2019-0000673, filed on Jan. 3, 2019, in the Korean Intellectual Property Office, the disclosure of which is herein incorporated by reference in its entirety.

BACKGROUND

1. Field

Methods and apparatuses consistent with example embodiments relate to fingerprint verification.

2. Description of Related Art

An electronic device uses various methods for security, such as verification or authentication. For example, the methods include an input method using a password or a personal identification number (PIN), and a lock method using a touchscreen.

In addition, the methods include a biometrics-based recognition method applied to a security system and/or a verification system to recognize a biological characteristic of an individual and determine whether to verify or authenticate the individual based on the recognized biological characteristic. The biometrics-based recognition method includes, for example, a fingerprint recognition method, a face recognition method, and a voice recognition method.

The biometrics-based recognition method is used to compare data registered by a user in a database (DB) of a verification system to data detected from the user when attempting verification, and determine a success or a failure of the verification.

SUMMARY

According to an aspect of an example embodiment, there is provided a method of verifying a fingerprint includes selecting a feature point from among feature points of a fingerprint image, the selected feature point matching a registered feature point; determining a partial region of the fingerprint corresponding to the feature point in the fingerprint image; obtaining feature information of the partial region of the fingerprint in the fingerprint image; and verifying the fingerprint based on the feature information of the partial region in the fingerprint image.

The obtaining of the partial region feature information may include performing a Radon transform on the at least one partial region, and obtaining the partial region feature information based on a result of the Radon transform.

According to another aspect of an example embodiment, there is provided a method of registering fingerprint information, the method including: extracting a feature point from a fingerprint image; determining at least one partial region corresponding to the extracted feature point; obtaining partial region feature information of the determined at least one partial region; and registering the obtained partial region feature information.

According to still another aspect of an example embodiment, there is provided an apparatus for verifying a fingerprint, the apparatus including: a sensor configured to obtain a fingerprint image; and a processor configured to verify fingerprint based on the fingerprint image, wherein the processor is further configured to: select a feature point from among feature points of a fingerprint image, the selected feature point matching a registered feature point; determine a partial region of the fingerprint corresponding to the feature point in the fingerprint image; obtain feature information of the partial region of the fingerprint in the fingerprint image; and verify the fingerprint based on the feature information of the partial region in the fingerprint image.

BRIEF DESCRIPTION OF THE DRAWINGS

The above and/or other aspects will be more apparent by describing certain example embodiments, taken in conjunction with the accompanying drawings, in which:

FIG. 5 is a flowchart illustrating an example of determining partial region feature information of each partial region according to an example embodiment;

FIGS. 7 and 8 are flowcharts illustrating an example of a fingerprint verification method according to an example embodiment;

DETAILED DESCRIPTION

Figure 1:
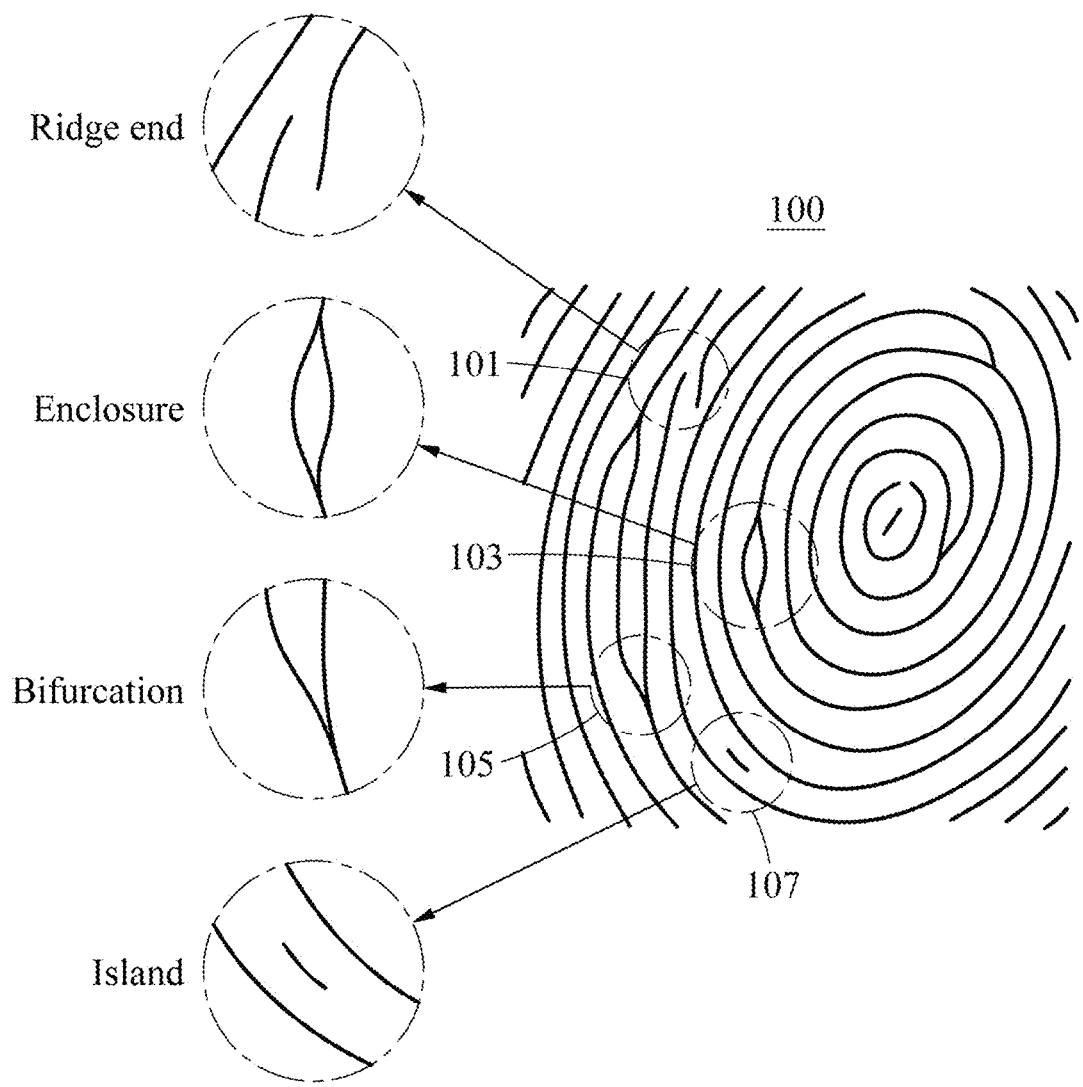
FIG. 1 is a diagram illustrating an example of a feature point of a fingerprint obtained from a fingerprint image according to an example embodiment.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the example embodiments of the disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Example embodiments to be described hereinafter may be applicable to recognize a fingerprint of a user. The recognizing of the fingerprint of the user may include verifying or identifying the user. The verifying of the user may include, for example, determining whether the user is a registered user. A result of the verifying may be output as true or false. The identifying of the user may include, for example, determining which user among registered users is the user. A result of the identifying may be output as an identity (ID) of one of the registered users. However, when the user does not correspond to anyone of the registered users, a signal indicating that the user is not identified may be output.

The example embodiments may be embodied in various forms of products, for example, a personal computer (PC), a laptop computer, a tablet PC, a smartphone, a television (TV), a smart home appliance, an intelligent vehicle, a kiosk, and a wearable device. For example, the example embodiments may be applicable to user verification used in, for example, a smartphone, a mobile device, and a smart home system. In addition, the example embodiments may be applicable to a payment service based on user verification. Further, the example embodiments may also be applicable to a smart vehicle system that is automatically started through user verification. Hereinafter, the example embodiments are described in detail with reference to the accompanying drawings. Like reference numerals in the drawings denote like elements.

FIG. 1 is a diagram illustrating an example of a feature point of a fingerprint obtained from a fingerprint image according to an example embodiment.

Referring to FIG. 1, a fingerprint image 100 may be an image of a fingerprint of a user that is obtained through a sensor included in a computing apparatus. The fingerprint image 100 includes feature points 101, 103, 105, and 107 indicating patterns unique for the user. The feature points 101, 103, 105, and 107 may also be referred to as minutiae, and indicate points at which distinguishing characteristics of the user are shown in the fingerprint image 100. The feature points 101, 103, 105, and 107 may indicate various types of morphological characteristics such as, for example, a ridge end, an enclosure, a bifurcation, and an island as illustrated respectively.

A feature point extracted from a fingerprint of a same user may have a consistent pattern. The term "consistent pattern" used herein may refer to a certain form of the feature point that is at a certain position in the fingerprint of the same user. Based on the foregoing, fingerprint verification may be performed through a comparison of information associated with a feature point of a query fingerprint image received from a user and information associated with a feature point, for example, the feature points 101, 103, 105, and 107, of a registered fingerprint image. A registered fingerprint image refers to a fingerprint image input in a fingerprint registration process. The registered fingerprint image may be a fingerprint image of a user obtained through a fingerprint scanner or a fingerprint sensor. The query fingerprint image refers to a fingerprint image input for user verification, and may be obtained through a terminal, a mobile terminal, a fingerprint scanner, a fingerprint sensor, and the like.

Comparing a feature point of the query fingerprint image and a feature point of the registered fingerprint image may be comparing a position of the feature point included in the query fingerprint image and a position of the feature point included in the registered fingerprint image, and comparing the number of feature points included in the query fingerprint image and the number of feature points included in the registered fingerprint image.

A feature point-based fingerprint verification method may be generally used in a fingerprint verification system due to its fast speed and reliable accuracy in verification. In addition, the feature point-based fingerprint verification method may store only information associated with a feature point in a database (DB) without storing a registered fingerprint image itself, and thus may increase a level of security and reduce an amount of data to be stored.

However, the accuracy of the feature point-based fingerprint verification method may decrease when the number of feature points extracted from the query fingerprint image is small, or an image quality of the query fingerprint image is low. The number of feature points extracted from a fingerprint image may be proportional to a size of the fingerprint image. Therefore, when the size of the fingerprint image is small, the accuracy of the feature point-based fingerprint verification method may decrease. Moreover, a fingerprint sensor has become smaller in size recently, and thus a fingerprint image may include a fewer number of feature points due to such recent trend.

In addition, the feature point-based fingerprint verification method may use only features at a position at which a feature pint is present in a fingerprint image, without considering a region other than the feature point, and thus may have a relatively high false recognition or verification rate.

A fingerprint verification method according to an example embodiment to be described hereinafter with reference to the accompanying drawings may have an improved accuracy by considering a feature of a region adjacent to or surrounding a feature point using a Radon transform, while retaining advantages of the existing feature point-based fingerprint verification method.

Figure 2:
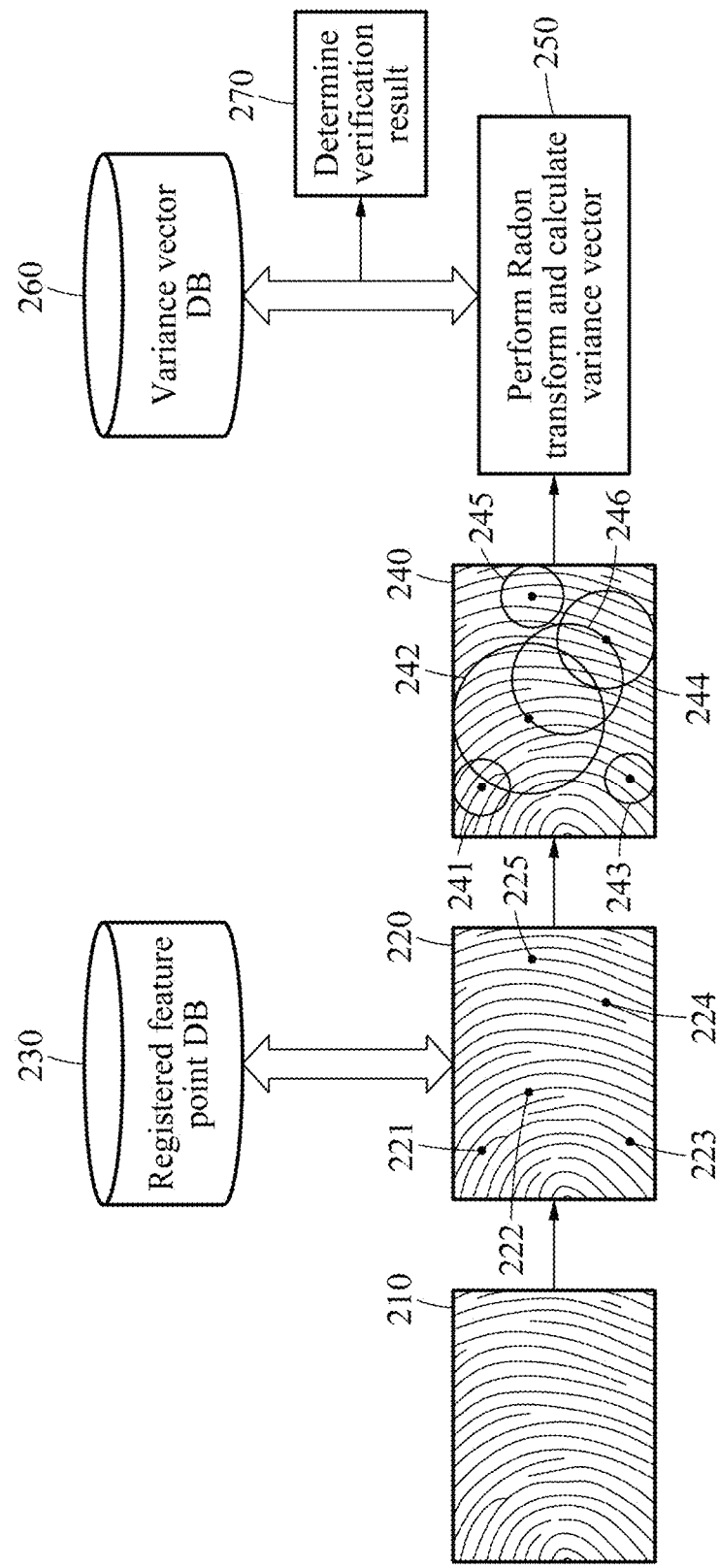
FIG. 2 is a diagram illustrating an example of a fingerprint verification method according to an example embodiment.

FIG. 2 is a diagram illustrating an example of a fingerprint verification method according to an example embodiment.

Referring to FIG. 2, a fingerprint verification apparatus receives a query fingerprint image 210 through an embedded sensor. The query fingerprint image 210 may be an image of a size that is preset based on a standard of the sensor.

As illustrated, the fingerprint verification apparatus extracts feature points 221, 222, 223, 224, and 225 from a query fingerprint image 220. The feature points 221, 222, 223, 224, and 225 may be minutiae as described above.

The fingerprint verification apparatus matches the extracted feature points 221, 222, 223, 224, and 225 to registered feature points in a registered feature point DB 230. The registered feature point DB 230 stores image information of feature points included in registered fingerprint images, or information associated with a position and a type of each feature point. The fingerprint verification apparatus matches the feature points 221, 222, 223, 224, and 225 to registered feature points based on image information of the registered feature point or information associated with a position and a type of the registered feature point. The matching refers to a process of determining a registered feature point corresponding to one or more of the feature points 221, 222, 223, 224, and 225.

The fingerprint verification apparatus determines a first matching feature point which matches the registered feature point among the feature points 221, 222, 223, 224, and 225. When the number of determined first matching feature points satisfies a preset condition, the fingerprint verification apparatus performs additional fingerprint verification. For example, the preset condition indicates that the number of first matching feature points exceeds a threshold value. The additional fingerprint verification may be verification performed based on a feature of a region surrounding or adjacent to the first matching feature point, and thus improve accuracy in fingerprint verification.

In an example scenario, all of the feature points 221, 222, 223, 224, and 225 in a query fingerprint image 240 matches registered feature points and are determined to be first matching feature points.

For the additional fingerprint verification, the fingerprint verification apparatus determines partial regions 241, 242, 243, 244, 245, and 246 in the query fingerprint image 240 corresponding to the feature points 221, 222, 223, 224, and 225. Each of the partial regions 241, 242, 243, 244, 245, and 246 is in a circular shape. However, this is merely an example and the disclosure is not limited thereto. The partial regions 241-246 may have any arbitrary shape other than the circular shape. The fingerprint verification apparatus obtains partial region feature information (or feature information) of each of the partial regions 241, 242, 243, 244, 245, and 246.

To obtain such partial region feature information, the fingerprint verification apparatus performs a Radon transform on each of the partial regions 241, 242, 243, 244, 245, and 246, and calculates a variance vector of each of the partial regions 241, 242, 243, 244, 245, and 246 obtained through the Radon transform in operation 250. The performing of the Radon transform on the partial regions 241, 242, 243, 244, 245, and 246 indicates performing the Radon transform on a fingerprint image corresponding to the partial regions 241, 242, 243, 244, 245, and 246. The fingerprint verification apparatus determines the calculated variance vector of each of the partial regions 241, 242, 243, 244, 245, and 246 to be the partial region feature information of each of the partial regions 241, 242, 243, 244, 245, and 246.

The fingerprint verification apparatus determines a verification result based on the partial region feature information and a variance vector prestored in a variance vector DB 260 in operation 270.

In the variance vector DB 260, a variance vector corresponding to each of feature points extracted from registered fingerprint images is registered. A variance vector registered in the variance vector DB 260 may be calculated in a similar way of calculating a variance vector for a query fingerprint image as described above. That is, the fingerprint verification apparatus determines a partial region corresponding to a feature point extracted from a registered fingerprint image, performs a Radon transform on the determined partial region, calculates a variance vector of a transformed partial region obtained through the Radon transform, and then registers the calculated variance vector in the variance vector DB 260.

The fingerprint verification apparatus determines, from the variance vector DB 260, a variance vector of a second matching feature point which is a registered feature point corresponding to at least one of the partial regions corresponding to the first matching feature points 221, 222, 223, 224, and 225. For example, when a partial region corresponding to the first matching feature point 221 is determined to be circles with radius 1 and radius 2, the fingerprint verification apparatus determines a registered variance vector corresponding to the second matching feature point corresponding to the first matching feature point 221 among variance vectors stored in the variance vector DB 260. The determined registered variance vector may be a variance vector calculated in advance for the partial region corresponding to the circles with radius 1 and radius 2 centered on the second matching feature point. The fingerprint verification apparatus determines the verification result based on a difference between the variance vector corresponding to the second matching feature point and the variance vector corresponding to each of the first matching feature points 221, 222, 223, 224, and 225 in operation 270. For example, when an absolute value of each difference in variance vector is less than or equal to a preset threshold value, the fingerprint verification apparatus determines that the query fingerprint image 210 is verified.

In another example, the fingerprint verification apparatus determines a variance value with respect to a difference between variance vectors determined respectively for the first matching feature points 221, 222, 223, 224, and 225. In response to the determined variance value being less than or equal to a preset threshold value, the fingerprint verification apparatus determines that the query fingerprint image 210 is verified. The determining of the verification result described herein is provided as an example of a method of determining a verification result, and the disclosure is not limited thereto. The fingerprint verification method according to an example embodiment may include various methods of verifying the query fingerprint image 210 by using variance vectors calculated with respect to the first matching feature points 221, 222, 223, 224, and 225. Any variation that is apparent to a person of ordinary skill in the art should be understood as being included in the disclosure.

Figure 3:
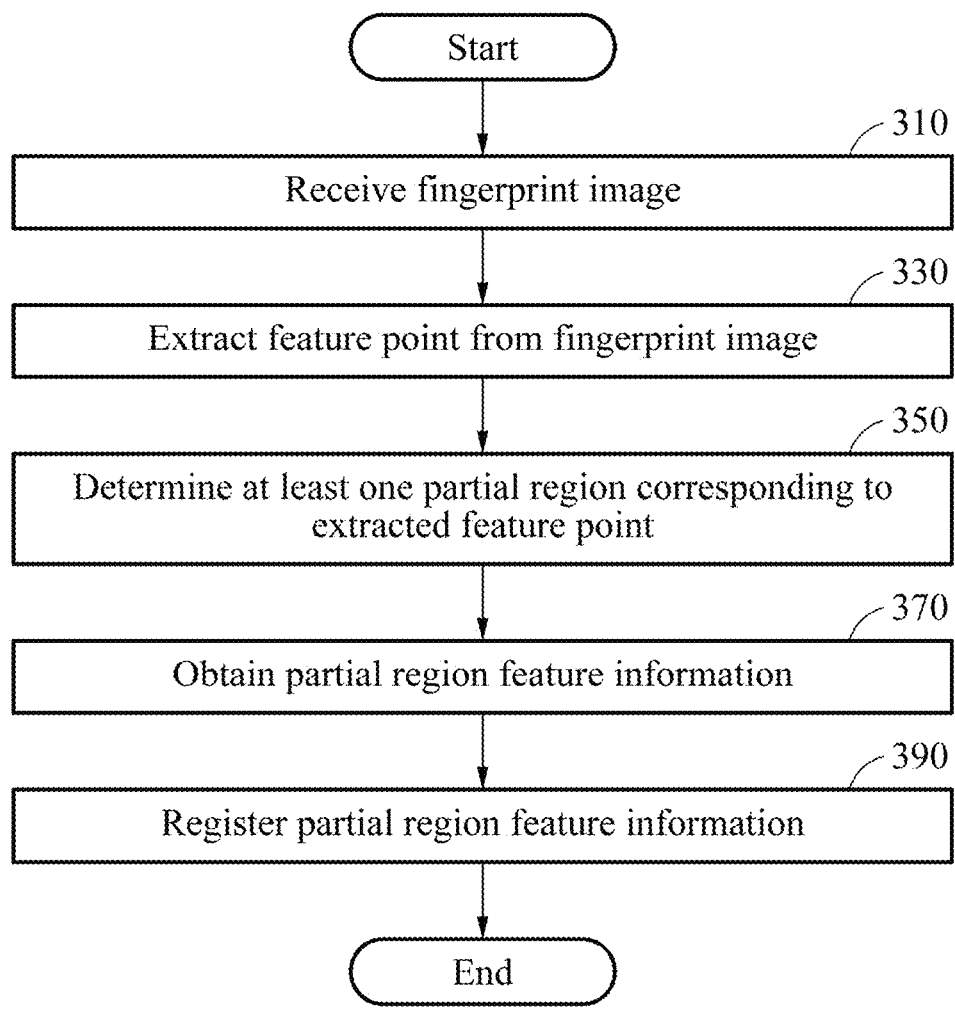
FIG. 3 is a flowchart illustrating an example of a fingerprint registration method according to an example embodiment.

FIG. 3 is a flowchart illustrating an example of a fingerprint registration method according to an example embodiment.

Referring to FIG. 3, in operation 310, a fingerprint verification apparatus receives a fingerprint image. The fingerprint verification apparatus may receive the fingerprint image through an embedded sensor. In an alternative example, the fingerprint verification apparatus may receive the fingerprint image from an external device that is communicatively connected to the fingerprint verification apparatus.

In operation 330, the fingerprint verification apparatus extracts a feature point from the received fingerprint image. The feature point may be, for example, minutiae included in the fingerprint image as described above.

In operation 350, the fingerprint verification apparatus determines at least one partial region corresponding to the extracted feature point.

In an example, the fingerprint verification apparatus determines a partial region corresponding to an extracted feature point based on a circular region centered on the extracted feature point. The circular region may have a radius determined based on a minimum distance among distances calculated between the extracted feature point and a boundary that defines the fingerprint image.

In another example, the fingerprint verification apparatus determines a partial region based on a circular region having, as a diameter, a distance between the extracted feature point and a neighboring feature point.

In still another example, the fingerprint verification apparatus extracts a plurality of partial regions corresponding to the extracted feature point based on circular regions corresponding to a preset number of different radii and centered on the extracted feature point. For example, the fingerprint verification apparatus may determine, to be a maximum partial region, a circular region having, as a maximum radius, a minimum distance between the extracted feature point and the boundary that defines the fingerprint image. In addition, the fingerprint verification apparatus may determine, to be partial regions, different circular regions having radii less than the maximum radius.

In operation 370, the fingerprint verification apparatus obtains partial region feature information of the determined partial region. Hereinafter, a method of determining the partial region feature information will be described later in detail with reference to FIG. 5.

In operation 390, the fingerprint verification apparatus registers, in a registered fingerprint DB, the partial region feature information obtained in operation 370. The fingerprint verification apparatus classifies the partial region feature information by a corresponding feature point and a size of a corresponding partial region, for example, a size of a radius, and registers the classified partial region feature information in the registered fingerprint DB.

Figure 4:
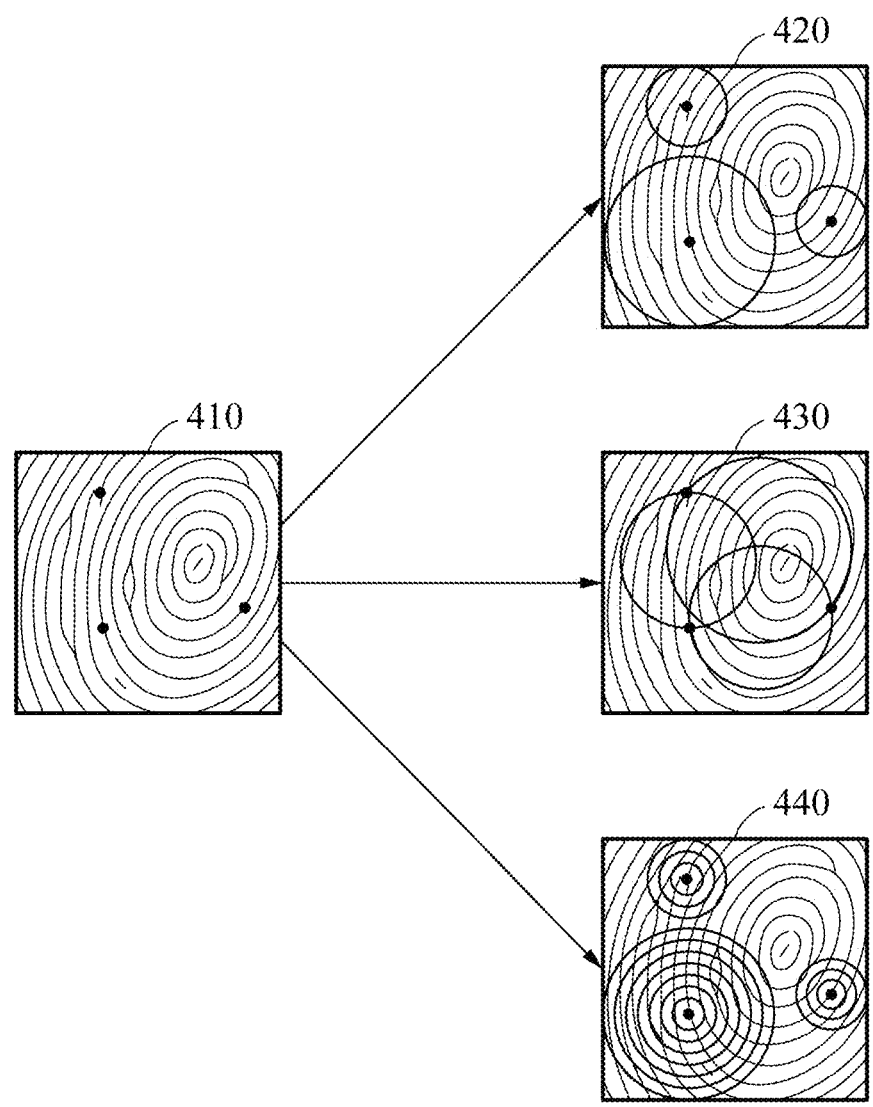
FIG. 4 is a diagram illustrating an example of determining a partial region corresponding to a feature point according to an example embodiment.

FIG. 4 is a diagram illustrating an example of determining a partial region corresponding to a feature point according to an example embodiment.

A method of determining a partial region to be described hereinafter with reference to FIG. 4 may be applicable to a fingerprint registration method and a fingerprint verification described herein.

A fingerprint verification apparatus determines a partial region based on a feature point extracted from a fingerprint image 410. In the fingerprint registration method, a feature point of the fingerprint image 410 may indicate all feature points extracted from the fingerprint image 410. However, in the fingerprint verification method, a feature point of a query fingerprint image, for example, the fingerprint image 410, to be used to determine a partial region may indicate a first matching feature point that matches a registered feature point.

Referring to FIG. 4, the fingerprint verification apparatus may determine, to be a partial region, a circular region centered on each feature point as illustrated in a fingerprint image 420. A radius of the circular region may be determined by a minimum distance among distances between each feature point and a boundary that defines the fingerprint image 420.

The fingerprint verification apparatus may determine, to be a partial region, a circular region having neighboring feature points as both end points of its diameter as illustrated in a fingerprint image 430.

In addition, the fingerprint verification apparatus may determine, to be partial regions, circular regions centered on each feature point and having a preset number of different radii as illustrated in a fingerprint image 440. A maximum radius of a partial region may be determined by a minimum distance among distances between each feature point and a boundary that defines the fingerprint image 440.

FIG. 5 is a flowchart illustrating an example of determining partial region feature information of each partial region according to an example embodiment.

Referring to FIG. 5, in operation 371, a fingerprint verification apparatus performs a Radon transform on the partial region determined in operation 350 of FIG. 3. The Radon transform is a process of performing a line integral on an image in an orthogonal coordinate system with respect to a projection angle and accumulating results therefrom in a Radon domain, and is performed based on Equation 1.

$$Rf(\theta,r)=\int_{-\infty}^{\infty}\int_{-\infty}^{\infty}|f(x,y)|\delta(x\cos\theta+y\sin\theta-r)dxdy \quad \text{[Equation 1]}$$

In Equation 1, f(x, y) denotes a fingerprint image corresponding to a partial region, and $Rf(\theta, r)$ denotes a transformed partial region obtained through the Radon transform. $\delta$ denotes a Dirac delta function, $\theta$ denotes a projection angle, and r denotes a position of a point at which the fingerprint image is projected into the Radon domain.

The fingerprint verification apparatus performs the Radon transform by projecting the fingerprint image corresponding to the partial region into the Radon domain based on Equation 1 above. The fingerprint verification apparatus projects the fingerprint image into the Radon domain, having a diameter of the partial region as a width. Here, the projection angle is in a range of 0 to 360°.

Figure 6A:
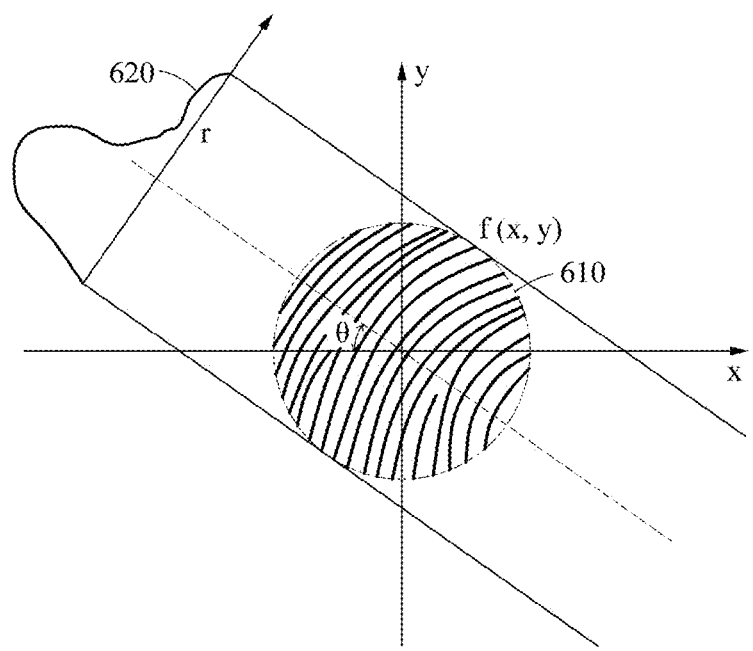
FIG. 6A is a diagram illustrating an example of a Radon transform performed on a partial region according to an example embodiment.
Figure 6B:
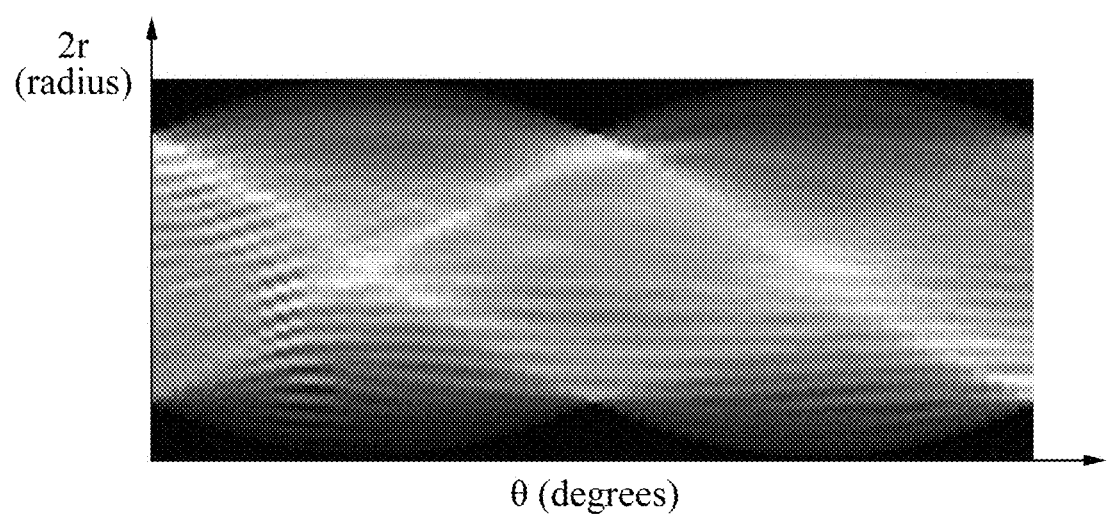
FIG. 6B is a diagram illustrating an example of a sinogram of a partial region obtained through a Radon transform according to an example embodiment.

A transformed partial region obtained through the Radon transform based on each projection angle (0 to 360°) may be represented in a form of sinogram as illustrated in FIG. 6B.

In operation 373, the fingerprint verification apparatus determines a variance vector of the transformed partial region. The fingerprint verification apparatus determines the variance vector based on Equation 2.

$$V(P)=\text{var}_\theta(Rf(\theta,r)) \quad \text{[Equation 2]}$$

In Equation 2, V(P) denotes a variance vector of a partial region P, $\theta$ denotes a projection angle, r denotes a position of a projection point in the Radon domain, and $Rf(\theta, r)$ denotes a transformed partial region obtained through the Radon transform.

The fingerprint verification apparatus calculates the variance vector of the partial region by calculating a variance value of $Rf(\theta, r)$ based on a change in the position r relative to each projection angle $\theta$.

In operation 375, the fingerprint verification apparatus obtains partial region feature information by determining the variance vector determined in operation 373 to be the partial region feature information.

FIG. 6A is a diagram illustrating an example of a Radon transform performed on a partial region according to an example embodiment.

Referring to FIG. 6A, a fingerprint verification apparatus projects a partial region 610 into a Radon domain at a projection angle $\theta$ based on Equation 1 above. A partial region transformed through the Radon transform is obtained in one-dimensional form as illustrated in a graph 620.

The fingerprint verification apparatus performs the Radon transform by projecting the partial region 610 into the Radon domain based on the projection angle $\theta$ in a range of 0 to 360°, and the transformed partial region obtained through the Radon transform is in a form of sinogram as illustrated in FIG. 6B.

FIG. 6B is a diagram illustrating an example of a sinogram of a partial region obtained through a Radon transform according to an example embodiment.

Referring to FIG. 6B, a sinogram may correspond to a result of performing a Radon transform on a partial region of a fingerprint image. The sinogram may be represented by varying brightness, and/or contrast, based on an output result $Rf(\theta, r)$ based on a projection angle $\theta$ (in a horizontal axis) and a position $r$ (in a vertical axis) at which the partial region is projected in a Radon domain. For example, as illustrated in FIG. 6B, a bright portion indicates a greater value of the output result $Rf(\theta, r)$, compared to a dark portion. A fingerprint verification apparatus calculates a variance vector of a transformed partial region obtained through the Radon transform as illustrated in the sinogram based on Equation 2 above.

Figure 8:
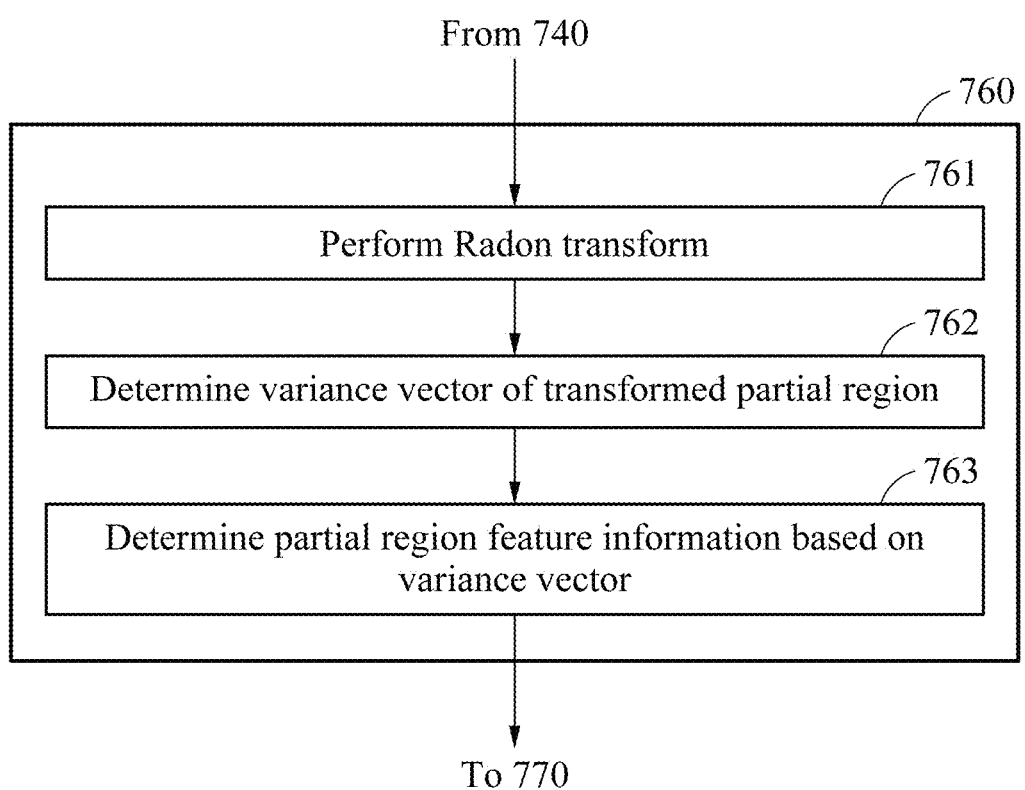

FIGS. 7 and 8 are flowcharts illustrating an example of a fingerprint verification method according to an example embodiment.

Referring to FIG. 7, in operation 710, a fingerprint verification apparatus receives a query fingerprint image. The fingerprint verification apparatus may obtain the query fingerprint image through an embedded sensor, and receive the query fingerprint image from the sensor.

In operation 720, the fingerprint verification apparatus extracts feature points from the query fingerprint image. The feature points may be minutiae as described above.

In operation 730, the fingerprint verification apparatus determines a first matching feature point that matches a registered feature point among the extracted feature points. The fingerprint verification apparatus determines whether a feature point extracted from the query fingerprint image matches the registered feature point by comparing an image of the extracted feature point of the query fingerprint image and an image of the registered feature point, or determines whether the extracted feature point matches the registered feature point based on positional information and type information of the registered feature point.

In operation 740, the fingerprint verification apparatus determines whether the number of determined first matching feature points satisfies a preset condition. For example, the preset condition indicates that the number of first matching feature points exceeds a threshold value.

In response to the number of first matching feature points not satisfying the condition, the fingerprint verification apparatus determines that verification of the query fingerprint image is unsuccessful.

In operation 750, in response to the number of first matching feature points satisfying the condition, the fingerprint verification apparatus determines a partial region in the query fingerprint image corresponding to the first matching feature point. The partial region may be determined in a same way as described above with reference to FIG. 4.

In operation 760, the fingerprint verification apparatus obtains partial region feature information of the determined partial region. Referring to FIG. 8, in operation 761, the fingerprint verification apparatus performs a Radon transform on the partial region. In operation 762, the fingerprint verification apparatus determines a variance vector of a transformed partial region obtained through the Radon transform. The variance vector may be determined based on Equation 1 above.

In operation 763, the fingerprint verification apparatus determines the variance vector to be the partial region feature information.

Referring back to FIG. 7, in operation 770, the fingerprint verification apparatus determines a verification result of the query fingerprint image based on the partial region feature information.

In an example, the fingerprint verification apparatus determines the verification result based on a difference between a registered variance vector corresponding to the partial region and a variance vector corresponding to the partial region feature information. For example, when a partial region $P_{m_1}$ corresponding to a first matching feature point $m_1$ is determined and a corresponding variance vector $V(P_{m_1})$ is calculated, a difference between the variance vector $V(P_{m_1})$ and a registered variance vector $V'(P_{m_1})$ corresponding to a second matching feature point $m_1'$ which is a registered feature point corresponding to the first matching feature point $m_1$ is calculated. Similarly, differences between variance vectors, for example, $V(P_{m_1})-V'(P_{m_1})$, $V(P_{m_2})-V'(P_{m_2})$, ..., $V(P_{m_n})-V'(P_{m_n})$, for all of first matching feature points, for example, $(m_1, m_2, \ldots, m_n)$, are calculated. When absolute values of the differences are all less than a preset threshold value, the fingerprint verification apparatus may determine that the query fingerprint image is verified.

In another example, the fingerprint verification apparatus calculates a variance value with respect to a difference in variance vector and determines the verification result based on the calculated variance value. For example, when a variance value with respect to an absolute value of a difference in variance vector, for example, $var(V(P_{m_1})-V'(P_{m_1}), V(P_{m_2})-V'(P_{m_2}), \ldots, V(P_{m_n})-V'(P_{m_n}))$, is less than a preset threshold value, the fingerprint verification apparatus may determine that the query fingerprint image is verified.

The above examples are given for illustrative purposes only, and do not limit the disclosure. Any method of verifying the query fingerprint image by using variance vectors corresponding to the partial region and the partial region feature information should be understood as being included in the disclosure.

Figure 9:
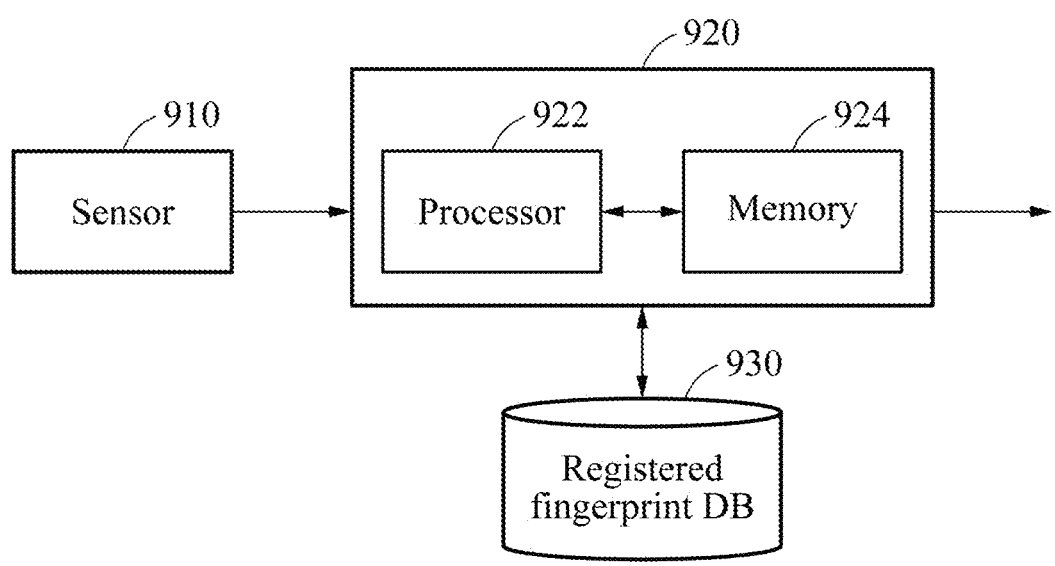
FIG. 9 is a diagram illustrating an example of a fingerprint verification apparatus according to an example embodiment.

FIG. 9 is a diagram illustrating an example of a fingerprint verification apparatus according to an example embodiment.

Referring to FIG. 9, a sensor 910 may obtain fingerprint information of a user who attempts fingerprint verification and generate a query fingerprint image. The query fingerprint image may be transmitted to a fingerprint verification apparatus 920, and the fingerprint verification apparatus 920 may perform the fingerprint verification by comparing the query fingerprint image and at least one of registered fingerprint images stored in a registered fingerprint DB 930. The user may register a fingerprint image of each of at least one finger in a fingerprint registration process, and the registered fingerprint DB 930 may store information associated with the registered fingerprint image. The registered fingerprint DB 930 includes a registered feature point DB for storing a feature point of a registered fingerprint, and a variance vector DB for storing a variance vector calculated for each registered feature point.

The fingerprint verification apparatus 920 may perform one or more operations described herein with respect to the fingerprint verification, and provide the user with a result of the fingerprint verification. The fingerprint verification apparatus 920 may output the result of the fingerprint verification in a form of, for example, voice, vibration, characters, images, videos, and the like. However, the output form is not limited to the foregoing examples, and the fingerprint verification apparatus 920 may output the result of the fingerprint verification in various forms.

The fingerprint verification apparatus 920 includes at least one processor 922 and a memory 924. The memory 924 may be a non-transitory computer readable medium or device connected to the processor 922, and store instructions, which when executed by the processor 922, causing the processor 922 to implement one or more operations described herein.

The memory 924 may also store data to be processed by the processor 922 or data having been processed by the processor 922. The memory 924 may include, for example, a high-speed random-access memory (RAM) and/or a non-volatile computer-readable storage medium (e.g., at least one disk storage device, a flash memory device, or other nonvolatile solid-state memory devices).

The processor 922 may execute instructions to perform one or more operations described above with reference to FIGS. 1 through 8. For example, the processor 922 may determine a first matching feature point which matches a registered feature point among feature points extracted from the query fingerprint image, determine a partial region in the query fingerprint image corresponding to the first matching feature point when the number of determined first matching feature points satisfies a preset condition, obtain partial region feature information of the determined partial region, and determine a verification result of the query fingerprint image based on the obtained partial region feature information. The processor 922 may perform a Radon transform on the partial region, determine a variance vector of a transformed partial region obtained through the Radon transform, and determine the verification result of the query fingerprint image based on a difference between the determined variance vector and a registered variance vector.

In the example embodiment of FIG. 9, it is shown that the sensor 910 is provided separately from the fingerprint verification apparatus 920. However, this is merely an example and the sensor 910 may be provided in the fingerprint verification apparatus 920.

Figure 10:
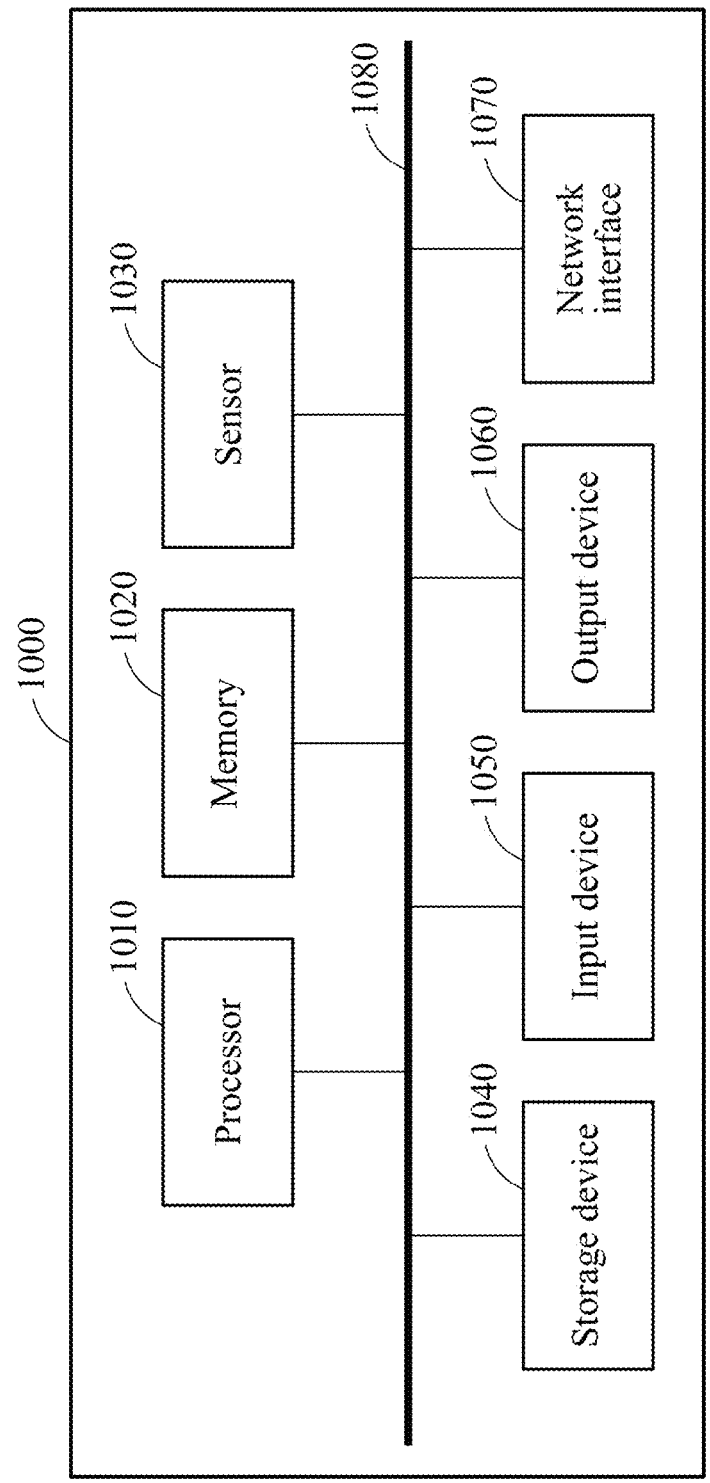
FIG. 10 is a diagram illustrating an example of a computing apparatus according to an example embodiment.

FIG. 10 is a diagram illustrating an example of a computing apparatus according to an example embodiment.

Referring to FIG. 10, a computing apparatus 1000 may obtain a fingerprint image of a user, and perform fingerprint verification by comparing the obtained fingerprint image and a registered fingerprint image. The computing apparatus 1000 may include functions of the fingerprint verification apparatus 920 of FIG. 9. The computing apparatus 1000 includes a processor 1010, a memory 1020, a sensor 1030, a storage device 1040, an input device 1050, an output device 1060, and a network interface 1070. The processor 1010, the memory 1020, the sensor 1030, the storage device 1040, the input device 1050, the output device 1060, and the network interface 1070 may communicate with one another through a communication bus 1080.

The processor 1010 may implement functions and instructions to operate in the computing apparatus 1000 as described herein. For example, the processor 1010 may execute instructions stored in the memory 1020 or the storage device 1040. The processor 1010 may perform one or more, any combination, operations described above with reference to FIGS. 1 through 9.

The memory 1020 may store information to be used for the fingerprint verification. The memory 1020 may include a computer-readable storage medium or device. For example, the memory 1020 may include a RAM, a dynamic RAM (DRAM), a static RAM (SRAM), or other types of nonvolatile memories. The memory 1020 may store instructions to be executed by the processor 1010, and related information while a software or application is being executed by the computing apparatus 1000.

The sensor 1030 may obtain a query fingerprint image in response to a fingerprint input from a user. The fingerprint input may include all types of action or manipulation performed by the user to input a fingerprint of the user. For example, when a finger of the user touches a sensing region of the sensor 1030 or a finger of the user swipes at the sensing region, the sensor 1030 may sense a fingerprint of the finger. In this example, in a case in which the sensor 1030 is integrated in a display, the sensing region may be represented by a surface of the display, and the sensor 1030 may sense a fingerprint from a finger that is in contact with the display. The sensor 1030 may be embodied to perform the foregoing operations through various methods, for example, an ultrasonic method, a mutual capacitance method, and an infrared image capturing method. The sensor 1030 may capture, as a fingerprint image, a fingerprint region corresponding to the sensing region.

The storage device 1040 may include a computer-readable storage medium or a computer-readable storage device. The storage device 1040 may store a DB including information associated with registered fingerprint images. The storage device 1040 may store a greater amount of information for a longer period of time, compared to the memory 1020. The storage device 1040 may include, for example, a magnetic hard disk, an optical disc, a flash memory, an erasable programmable read-only memory (EPROM), a floppy disk, or other types of nonvolatile memories.

The input device 1050 may receive an input from a user through a tactile, video, audio, or touch input. The input device 1050 may include, for example, a keyboard, a mouse, a touchscreen, a display, a microphone, a fingerprint reader, a retinal scanner, and other devices configured to detect the input from the user and transmit the detected input to the computing apparatus 1000.

The output device 1060 may provide a user with an output of the computing apparatus 1000 through a visual, auditory, and/or tactile channel. For example, the output device 1060 may visualize information related to the fingerprint verification and provide the user with the visualized information. The output device 1060 may include, for example, a liquid crystal display (LCD), a light-emitting diode (LED) display, a touchscreen, a speaker, a vibration generator, and other devices configured to provide the output to the user.

The network interface 1070 may communicate with an external device through a wired or wireless network. The network interface 1070 may include, for example, an Ethernet card, an optical transceiver, a radio frequency transceiver, and other network interface cards configured to transmit and receive information. The network interface 1070 may wirelessly communicate with the external device using a communication method, such as, for example, Bluetooth, WiFi, or a third generation (3G), fourth generation (4G), or fifth generation (5G) communication method.

According to example embodiments described above, it is possible to perform fingerprint verification more accurately based on a feature point included in a fingerprint image and based further on a feature of a partial region surrounding or adjacent to the feature point. In addition, it is possible to perform the fingerprint verification irrespective of a fingerprint input direction by setting a partial region (e.g., partial region of a circular shape), and to perform the fingerprint verification more rapidly through a simple operation of a Radon transform. Further, a fingerprint verification apparatus described herein may store a variance vector in a DB without a need to directly store a fingerprint image to improve a level of security and reduce a required memory quantity.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or a combination(s) thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While a few example embodiments have been described above, the scope of the disclosure is not limited thereto and various modifications and improvements made by those of ordinary skill in the art to concepts defined in the following claims should be understood to fall within the scope of the disclosure.

What is claimed is:

1. A method of verifying a fingerprint, the method comprising:
    selecting a feature point from among feature points of a fingerprint image, the selected feature point matching a registered feature point;
    determining a partial region of the fingerprint image corresponding to the feature point;
    performing a Radon transform on the partial region, and calculating a variance vector of a transformed partial region obtained through the Radon transform;
    obtaining feature information based on the calculated variance vector; and
    verifying the fingerprint based on the feature information of the partial region in the fingerprint image.

2. The method of claim 1, wherein the determining the partial region comprises:
    determining the partial region corresponding to the feature point based on a circular region centered on the feature point.

3. The method of claim 2, wherein the circular region has a radius that is based on a minimum distance among one or more distances between the feature point and a boundary that defines the fingerprint image.

4. The method of claim 1, wherein the determining the partial region comprises:
    determining the partial region based on a circular region having, as a diameter, a distance between neighboring feature points.

5. The method of claim 1, wherein the determining the partial region comprises:
    obtaining a plurality of partial regions corresponding to the feature point based on a preset number of circular regions centered on the feature point, the preset number of circular regions having different radii.

6. The method of claim 1, wherein the verifying comprises:
    verifying the fingerprint based on a difference between a registered variance vector corresponding to the partial region and the variance vector corresponding to the feature information.

7. The method of claim 6, wherein the verifying comprises:
    calculating a variance value with respect to the difference; and
    verifying the fingerprint based on the calculated variance value.

8. A non-transitory computer-readable storage medium storing instructions that are executable by a processor to perform the method of claim 1.

9. A method of registering fingerprint information, the method comprising:
    extracting a feature point from a fingerprint image;
    determining at least one partial region of the fingerprint image based on a circular region having, as a diameter, a distance between the extracted feature point and a neighboring feature point;

obtaining feature information of the determined at least one partial region; and registering the obtained feature information.

10. The method of claim 9, wherein the circular region has a radius that is based on a minimum distance among one or more distances between the extracted feature point and a boundary that defines the fingerprint image.

11. The method of claim 9, wherein the obtaining comprises:

performing a Radon transform on the at least one partial region;

calculating a variance vector of a transformed at least one partial region obtained through the Radon transform; and obtaining the feature information based on the calculated variance vector.

12. An apparatus for verifying a fingerprint, the apparatus comprising:

a sensor configured to obtain a fingerprint image; and a processor configured to verify the fingerprint based on the fingerprint image, wherein the processor is further configured to:

select a feature point from among feature points of the fingerprint image, the selected feature point matching a registered feature point;

determine a partial region of the fingerprint image based on a circular region centered on the feature point, the circular region has a radius that is based on a minimum distance among one or more distances between the feature point and a boundary that defines the fingerprint image;

obtain feature information of the partial region of the fingerprint in the fingerprint image; and verify the fingerprint based on the feature information of the partial region in the fingerprint image.

13. The apparatus of claim 12, wherein the processor is further configured to:

perform a Radon transform on the partial region;

obtain a variance vector of a transformed partial region obtained through the Radon transform; and determine the obtained variance vector to be the feature information.

14. The apparatus of claim 13, wherein the processor is further configured to:

compare a registered variance vector corresponding to the transformed partial region and the variance vector corresponding to the feature information; and verify the fingerprint based on a result of comparison.

* * * * *